Figure 20:
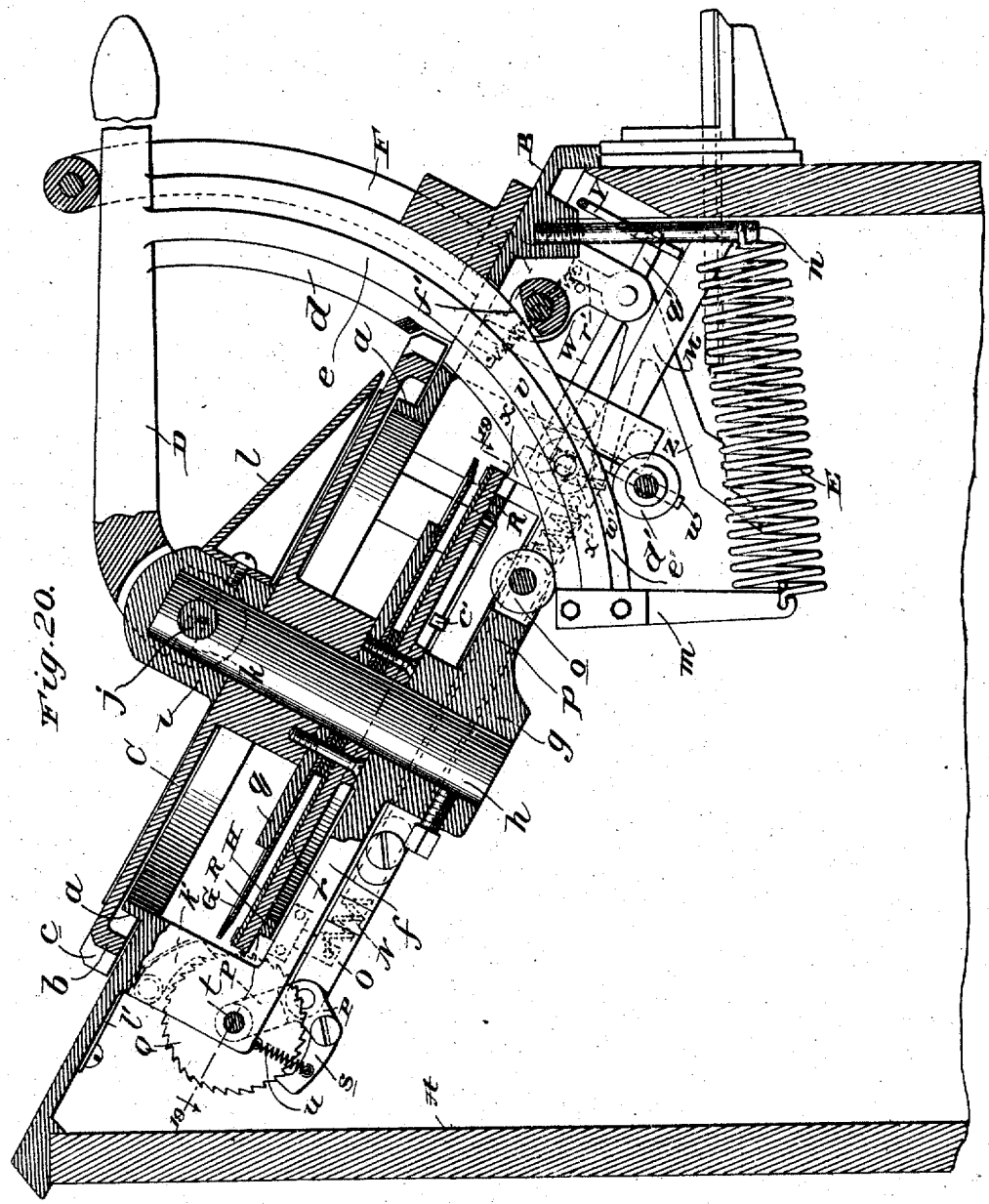

No. 781,620. PATENTED JAN. 31, 1905.
A. W. & A. H. ROOVERS.
DIE PRESS.
APPLICATION FILED MAR. 31, 1903.
6 SHEETS—SHEET 1.
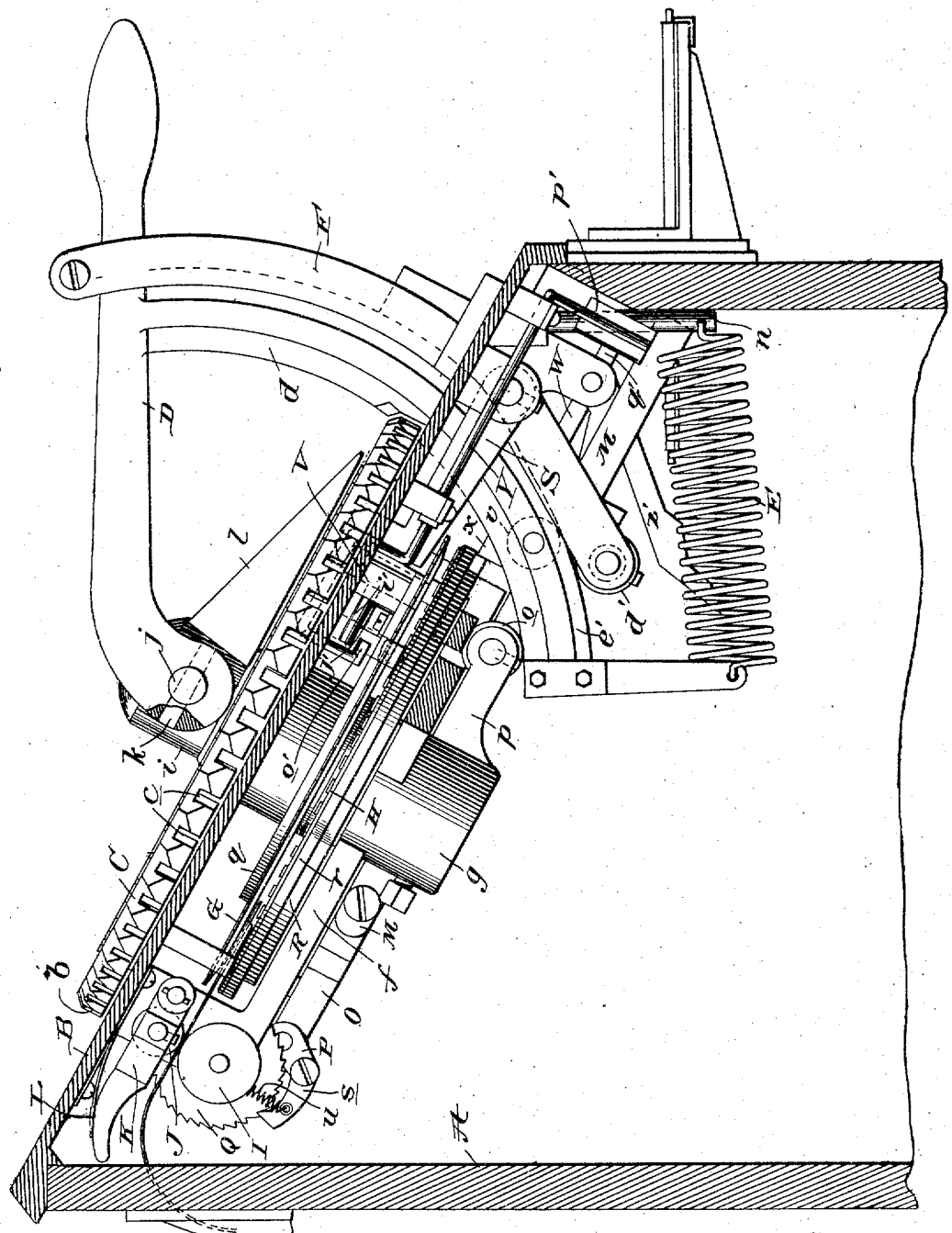
Witnesses
D. E. Burdine
J. B. Malnati
Inventors.
Alfred W. Roovers,
Alexander H. Roovers,
by Dodge Sons, Attorneys.

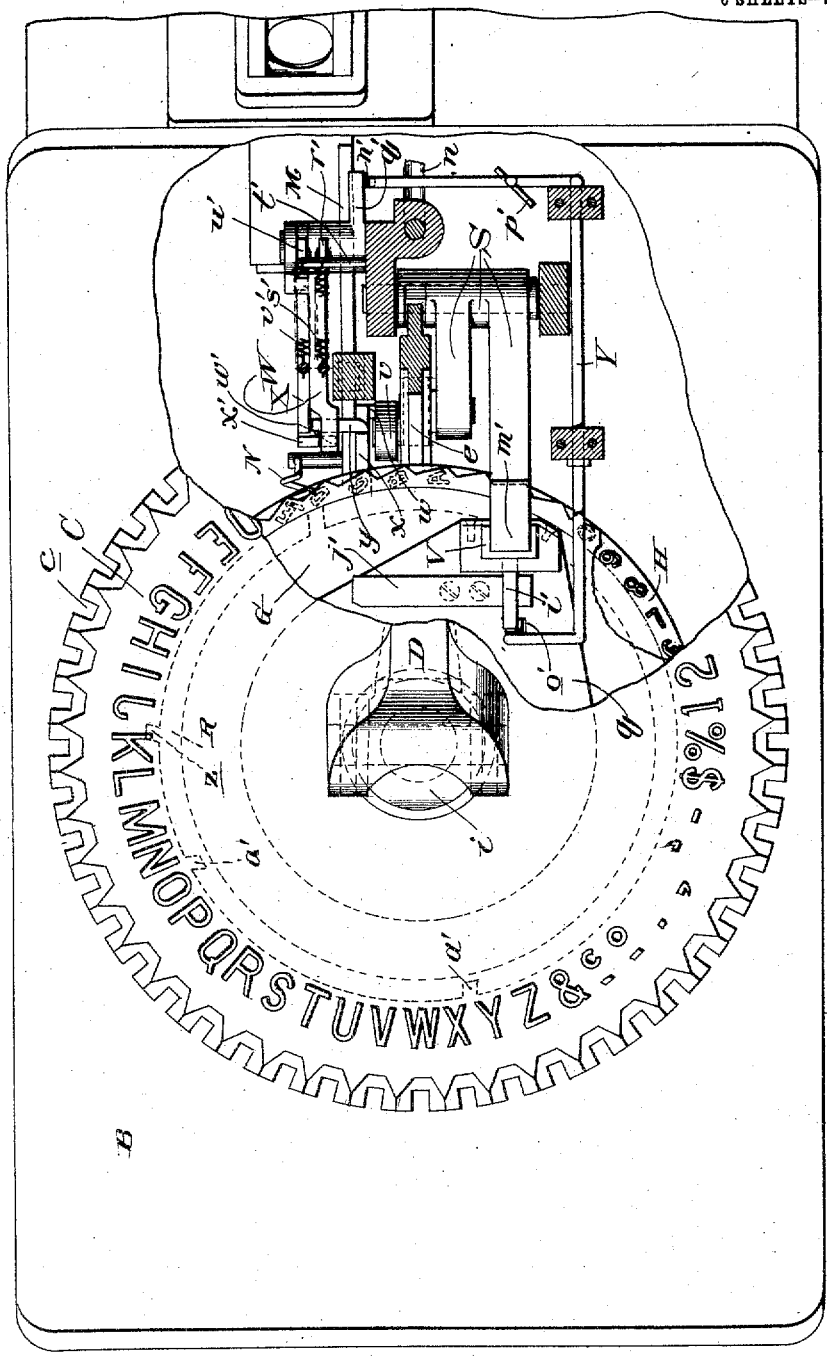

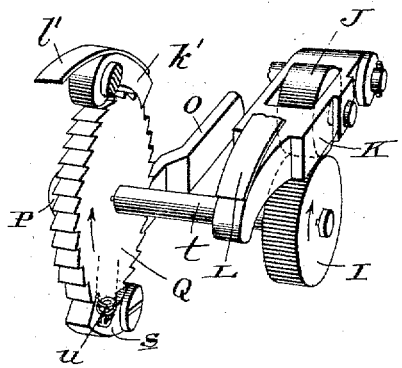
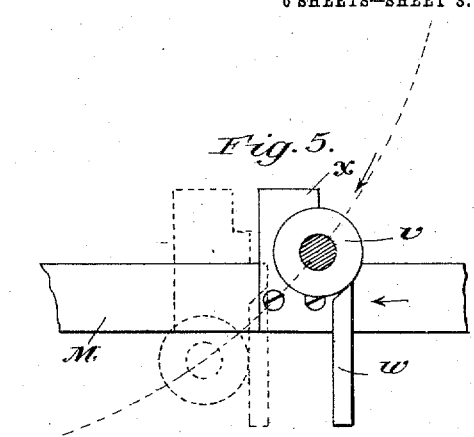
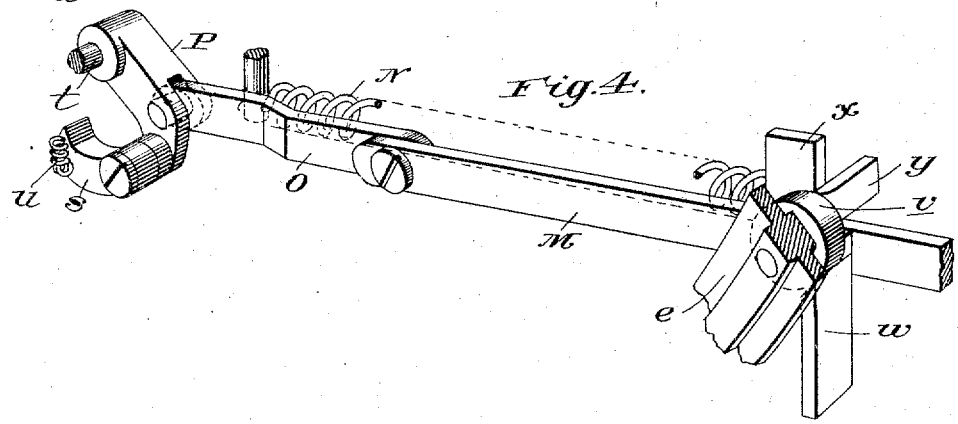
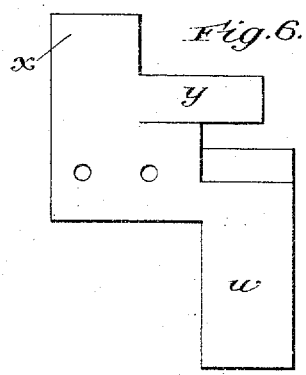
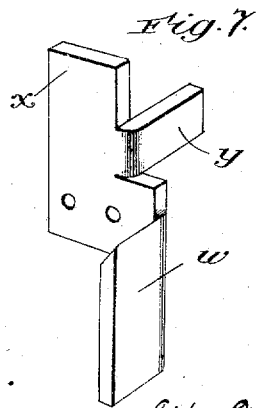

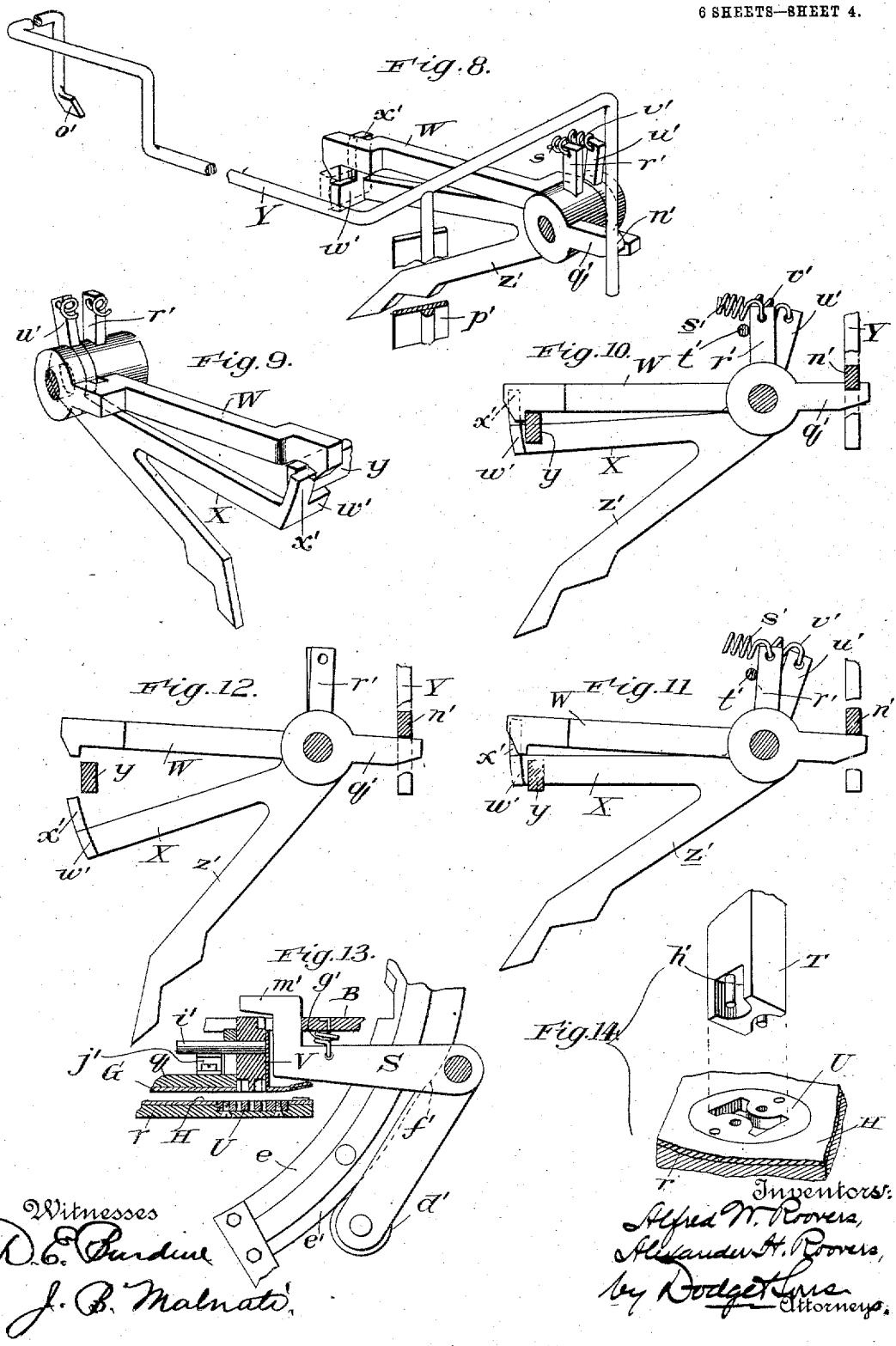

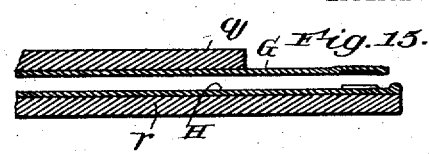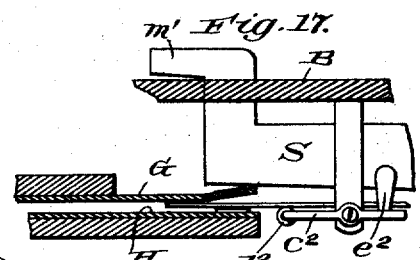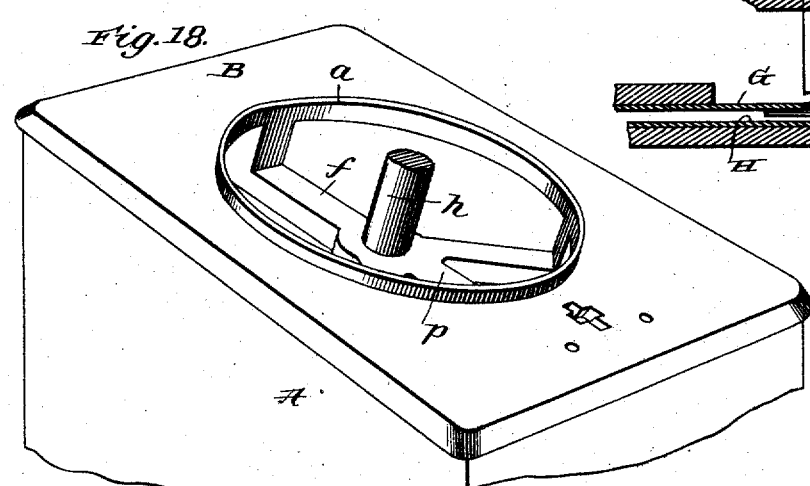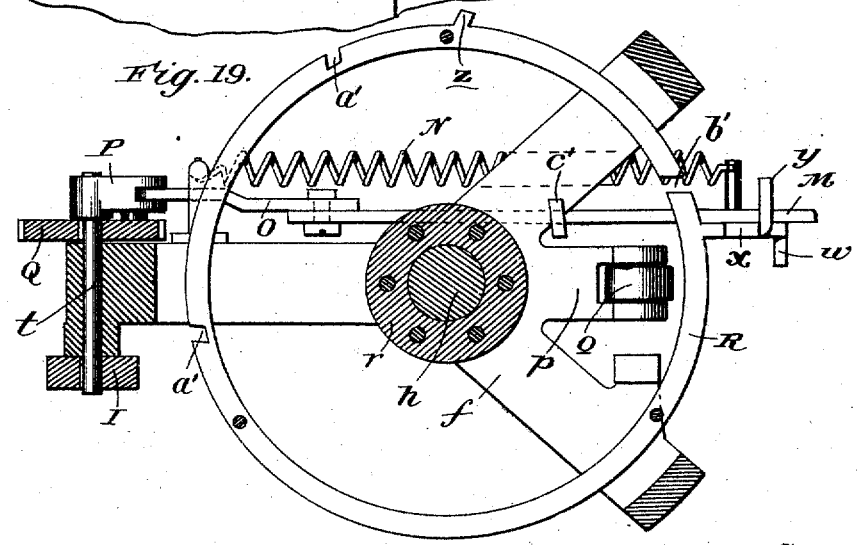

No. 781,620. PATENTED JAN. 31, 1905.
A. W. & A. H. ROOVERS.
DIE PRESS.
APPLICATION FILED MAR. 31, 1903.

6 SHEETS—SHEET 6.

Witnesses
Inventors
by
Attorneys

No. 781,620. Patented January 31, 1905.

UNITED STATES PATENT OFFICE.

ALFRED W. ROOVERS AND ALEXANDER H. ROOVERS, OF BROOKLYN, NEW YORK.

DIE-PRESS.

SPECIFICATION forming part of Letters Patent No. 781,620, dated January 31, 1905.

Application filed March 31, 1903. Serial No. 150,433.

*To all whom it may concern:*

Be it known that we, ALFRED W. ROOVERS and ALEXANDER H. ROOVERS, citizens of the United States, residing at Brooklyn, in the county of Kings and State of New York, have invented certain new and useful Improvements in Die-Presses, of which the following is a specification.

This invention relates to die-presses, and more particularly to such as are employed for embossing letters and characters in or upon metal strips to be used as name-plates.

The machine is of that general class now commonly known to the public as "name-plate" machines.

The present invention is in the nature of an improvement upon or a modification of that illustrated and described in Letters Patent of the United States dated the 19th day of November, 1901, and numbered 687,167 and 687,168, and has for its primary object the cheapening and simplifying of construction, facilitation of removal and replacement of parts, and ready change of letters or characters.

The new construction is illustrated in the accompanying drawings, wherein—

Figure 1 is a side elevation of the mechanism with the top plate, cabinet, or casing, and some other parts in section; Fig. 2, a top plan view of the machine with a portion of the top plate broken away to show parts beneath; Fig. 3, a perspective view illustrating details of the feed mechanism; Fig. 4, a perspective view showing the means for moving the feed-bar backward or in a direction to cause the feed-dog to engage a fresh tooth of the ratchet-wheel; Fig. 5, a diagrammatic view illustrating the action of the parts shown in Fig. 4; Fig. 6, a view illustrating the blank from which the stop-arm, locking-arm, and feed-bar wing are formed; Fig. 7, a perspective view showing said blank bent to proper form; Figs. 8 and 9, perspective views of the locking dogs or members; Figs. 10, 11, and 12, views illustrating the action of said locking-dogs; Fig. 13, a detail view of the pressure devices; Fig. 14, a perspective view of the finishing-dies; Figs. 15, 16, and 17, detail views illustrating means for counteracting the tendency of the embossed strip or plate to bend or curl in one direction; Fig. 18, a perspective view, on a reduced scale, of the top of the cabinet or casing with the dial-plate, die-plates, actuating-lever, &c., removed; Fig. 19, a detail sectional view taken on the line 19 19 of Fig. 20; and Fig. 20, a vertical sectional view through the body and top plate of the cabinet, showing the mechanism of the press in full lines.

In its general plan and mode of operation the present machine has many points of resemblance to that shown and described in the above-mentioned prior patents. It differs therefrom in that instead of employing independent sliding or reciprocating character-dies the dies are here carried by metallic plates or disks which may, if desired, be slitted to permit independent springing of different die-carrying sections of one of the disks, the companion die member in each case being sustained by a rigid disk or plate. The strip-feeding devices, locking mechanism, and other parts are likewise modified, as will appear from the detailed description which follows.

Referring again to the drawings, A indicates a cabinet or casing provided at its top with a cover or top plate B, preferably flanged to better hold it in position upon the cabinet to which it is screwed, bolted, or otherwise made fast. The cover or top plate B supports and carries the mechanism which comprises a dial provided with a full set of characters corresponding to or standing for those which the machine is adapted to produce and which dial may be turned to bring to a common impression-point any series of characters in proper succession, a pointer or indicator in connection with which the indications on the dial are read and placed, die-plates connected and rotatable with and by the dial-plate, strip-feeding mechanism by which the strip to be embossed is fed to and past the impression or embossing point, pressure devices for forcing the dies together, locking devices for holding the feeding mechanism out of action, and a trip device by which said lockout may be tripped and caused to engage and lock the feeding devices at proper times.

The top-plate B is provided on its upper surface with an annular flange or bead $a$, which rises beneath the dial-plate and stands just within the depending skirt thereof, as seen in Fig. 20. The purpose of this bead or flange is to prevent rain or moisture from finding its way to the mechanism beneath the dial-plate, the top-plate being preferably placed at an angle in order to cause rain or water to flow from the top-plate and for the further purpose of causing the finished strip to drop out of the mechanism to a delivery-chute, through which it is carried to the outside of the casing or cabinet.

C indicates the dial-plate, which is formed with a depending skirt or flange $b$ overhanging or extending outside of the bead $a$, as seen in Fig. 20. The dial-plate is provided with peripheral notches $c$, designed to receive a locking-rib $d$, formed upon a segmental arm $e$ of a hand-lever D, through which is applied the power necessary to actuate the mechanism after the dial is turned to properly position the dies.

Beneath the top-plate B and carried by lugs or standards cast with or bolted to said plate is a supporting-frame or spider $f$, provided with a boss $g$, in which is firmly secured an upright stem or axle $h$, which serves as an axle for the dial-plate C and the die-plates and their backings carried by said dial-plate, the top plate B being formed with a circular opening concentric with the stem or axle to permit the introduction and removal of the die-plates and connected parts.

Above the dial-plate C there is secured to the stem or axle $h$ a block $i$, which holds the dial-plate in position and prevents its lifting therefrom. This block $i$ is held in place by a pin $j$, passing transversely through the block and stem and in turn held by a pin $k$ or in any other convenient way. The pin $j$ serves the further purpose of an axle or pivot for the actuating-lever D, the fulcrum end of which is bifurcated to straddle the block $i$, its two arms being fashioned into ears, which are perforated to receive the pin $j$, as will be understood upon referring to Figs. 1 and 2. The block $i$ serves the further purpose of a support for a pointer or indicator $l$, which may, however, be attached to the top plate B, if preferred. The purpose of the pointer or indicator $l$ is to enable the operator to determine when the dies necessary to produce any given character are in proper position to be operated and to emboss or form said character on the strip of metal or other material, the characters upon the dial-plate being so positioned with reference to the dies that when any given character on the dial-plate is directly opposite the pointer the corresponding dies shall be in embossing or operative position.

The peripheral notches $c$, formed in the dial-plate C, produce intermediate lugs or projections, as seen, the upper edges of which are beveled, as shown in Figs. 1 and 2, to facilitate the entrance of the rib $d$ of the hand-lever D between said lugs or into the notches $c$, the lower extremity of rib $d$ being also beveled to prevent its engaging with the apexes of the lugs on the dial-plate. By thus beveling the coacting parts the rib $d$ is caused to enter the notches $c$ with ease and certainty, even though the dial-plate be not precisely positioned by the user of the machine, the inclined faces of coacting parts riding one upon the other until the body of the rib enters the notch and brings the dial to and holds it in the precise position required.

The segmental arm $e$ of lever D is curved concentrically with the axis of pin $j$, which forms the fulcrum of lever D, as seen in Fig. 1. At its lower extremity the segment $e$ is provided with a projecting arm $m$, to which is attached one end of a spring E, the other end of which is made fast to a stem or post $n$, screwed into or carried by a lug on the under side of the top plate B, as shown in Fig. 1. This spring, which can be made of such size as to give at once considerable strength and great elasticity, serves to hold lever D in the elevated position indicated in Fig. 1, its elevation being limited by a stop-shoulder at the upper end of a curved guiding-arm F, made fast to the top plate B. To guide and sustain the segment $e$ and prevent its springing or bending out of shape, a supporting-roller $o$ is mounted in a bracket $p$, projecting from the boss $g$ of the spider or supporting-frame $f$, as best seen in Fig. 1, said roller bearing against the forward or inner edge of the segment $e$, as indicated.

G and H indicate the die-plates, which will preferably be made of steel or other metal in the form of substantially circular disks, one bearing the letters or characters in intaglio or sunken form and the other in relief. The characters in relief will be of proper dimensions and form to enter the companion sunken dies, and the relative dimensions will be such as to permit the material of the strip of metal or other substance operated upon to be forced into the sunken dies by the raised ones. As under the present construction it is intended to spring or move only one die-plate—the upper one under the arrangement illustrated—and as the springing of such plate will cause at least a minute change in the relative planes of the two die-plates, the lower face of the upper plate may be slightly beveled or curved, as indicated in Fig. 1, so that when it is forced to the position necessary to completely emboss or raise the character in or upon the strip the opposing faces of the two die-plates at the point of operation shall be parallel. The die-plates G and H are supported or backed by heavier plates $q$ and $r$, the former of less area than die-plate G and the latter corresponding in form and dimensions with the die-plate H. The die-plates are slightly separated from each other, as indicated in Fig. 1, by washers or otherwise, and they, with their backing-plates, are firmly secured together by screws. The parts thus assembled and united are in turn made fast to the boss or neck of the dial-plate C by other screws, as indicated in Fig. 20. This arrangement of the die-plates possesses the advantages of permitting ready adaptation of the machine to the formation of characters of different styles and sizes, it being only necessary to remove the lever D and block $i$ in order to withdraw the dial-plate and the die-plates from the machine, after which, by taking out the screws which secure the die-plates and their backings to their neck or boss, another pair of die-plates, with their backings, may be quickly substituted and the parts returned to position ready for operation. The lowermost backing or supporting plate of the die-plates rests upon a slightly-raised boss, encircling the stem or axle $h$ and formed upon the supporting-frame or spider $f$, thus affording support not only for the die-plates, but also for the dial-plate C connected therewith, and maintaining all at proper heights relatively to other parts of the machine.

The material of which the name-plates are to be formed, preferably a narrow strip or ribbon of thin aluminium, is wound upon a reel and passes thence, preferably through a curved guide applied to the outside of the cabinet, to and between feeding-rolls I and J, of which the former is the feeding-roll proper and the latter a pressure-roll designed to hold the strip in contact with the feeding-roll I and afford pressure sufficient to insure its movement by the latter. The pressure-roll J is carried in a pivoted or swinging yoke or frame K, which is pressed in a direction to force roll J against roll I by means of a spring L. The yoke or frame K is provided with a finger-piece by which to lift roll J away from or out of contact with roll I when inserting the end of a fresh strip or ribbon. From the rolls I and J the strip passes, preferably through a suitable directing-guide, to the embossing-point, its forward end projecting beyond the guide and lying between the die-plates G and H at the point where the dies are to act upon it. The feed or advance of the strip is effected by the mechanism shown in Figs. 1, 2, 3, and 4. This comprises a longitudinally-reciprocating feed-bar M, which is thrown in one direction by a spring N, connected at one end to a stud projecting from the side of bar M and at the other end to a post or lug attached to the frame or spider $f$, as best seen in Fig. 2. To the rear end of sliding bar M, which bar moves through suitable guides, is pivotally attached a link O, which in turn is pin-jointed to a swinging yoke P, carrying a pivoted dog or pawl $s$. The yoke P is hung upon the shaft $t$, to one end of which is secured the feeding-roll I and which carries at its other end a ratchet-wheel Q, the outer end of the dog $s$ being held in engagement with the teeth of the ratchet-wheel by a spring $u$. The yoke P being hung upon the axle or shaft $t$ swings concentrically about the ratchet-wheel Q, maintaining a fixed relation to its periphery, and consequently the dog $s$ maintains at all times a proper relation to the teeth of the ratchet however far the yoke P may be swung, the spring $u$ permitting the dog to ride freely back over the ratchet-teeth when the feed-bar is moved in opposition to the pull of spring N. Backward rotation of the ratchet-wheel Q is prevented by a dog or pawl $k'$, preferably held in engagement with the teeth of the ratchet by a spring $l'$. The movement of the feed-bar M in opposition to spring N is produced by a roller, stud, or bowl $v$, projecting from one side of the segmental arm $e$ of lever D and acting upon a wing or plate $w$, projecting laterally from the side of the bar M, as best indicated in Fig. 4. The wing $w$ is conveniently made in one piece, with a stop arm or lug $x$ and an arm $y$, which latter is engaged by the locking-dogs, which hold the slide out of action at certain times. Fig. 6 illustrates the sheet-metal blank of which said parts are formed, and Fig. 7 shows in perspective the blank bent to produce the wing $w$, stop-plate $x$, and arm $y$. It will be observed that the upper edge of the wing $w$ is beveled or inclined, and, as indicated in Figs. 4 and 5, this inclination is practically parallel with the path of travel of roller $v$. Said roller $v$ is so positioned on arm $e$ that when the lever D is at its highest point the roller stands opposite or over the beveled face of wing $w$. As the lever D descends and carries downward the arm $e$ the roller $v$ rides from said beveled or inclined upper face, and the spring N, drawing the bar M forward, keeps the inner vertical face of wing $w$ against the periphery of roller $v$. As the roller $v$ travels in a curved path of which the axis of pin $j$ is the center, it of course moves inward or away from the front of the machine, and consequently the wing or plate $w$ and the bar M by which it is carried similarly move inward, thereby swinging the yoke P, advancing the dog $s$, and turning the ratchet-wheel Q, which in turn rotates the shaft or axle $t$ and the feed-roller I, thereby producing the feed or advance of the strip. The extent of feed or advance of the strip is determined by a stop-ring R, which is here represented as secured to the under side of the backing plate or disk $r$ of the lower die-plate. This stop-ring stands in the path of the stop arm or lug $x$ and serves to arrest the same, and consequently the bar M, the periphery of said stop-ring being provided with projections $z$ at those points where the feed is to be slight—as, for instance, such letters as "I," "l" and the like—and with depressions $a'$ at those points where the feed is to be considerable, as for letters "W" and "M." Other letters and characters, or those falling in the intermediate group constituting the bulk of the characters produced, require uniform feeding, and for such the periphery of the stop-ring, without projection or depression, forms a proper stop. At one point an abnormal or extended feed is required, and that is at the point controlling the starting action of the machine. At such point an opening $b'$ is cut entirely through the ring and a stop $c'$ is formed in line therewith to arrest the lug or arm $x$ at the proper point. This extended feed is provided in order to give a blank space between the end of the strip to be produced and the first letter or character embossed or formed therein. The opening $b'$ and stop $c'$ are so located that when they are exactly in alinement with the stop arm or lug $x$ the word "Start," or the indication on the dial-plate C which stands therefor, is opposite the pointer. The distance that bar M is permitted to move inward determines the throw of the yoke P and the travel of the dog $s$, and consequently the number of degrees through which the feed-roll I shall be turned. Hence the arrangement of the stops determines the extent of feed of the strip or material to be embossed.

The machine is normally locked out of action. Ordinarily it will be provided with coin-controlled releasing devices of any suitable character. These need not be further described or referred to herein; but the locking device will be described particularly in its present form, which is designed especially for the other mechanism here set forth.

By rotating the dial and bringing opposite the pointer or indicator $l$ the character or indication on said dial corresponding to the feed required or the character to be produced the die-plates are turned to correspond and the machine is made ready to perform its functions. At the outset the word "Start" is brought opposite the indicator, and, as just explained, the strip is fed forward far enough to leave between its end and the point of impression a suitable blank space, the hand-lever D being depressed to permit the bar M to move inward and the feed to take place under the force of spring $u$. The lever being permitted to rise again and the dial being turned to bring the proper character opposite the indicator, the depression of the lever is repeated, the feed takes place as before, and then the dies are forced together to produce the desired character in the strip. The means for effecting such pressure are illustrated in Figs. 1, 2, and 13. As best shown in the latter figure, an elbow-lever S is fulcrumed in hangers or brackets on the under side of the top plate B and has a depending arm, carrying at its lower end a roller $d'$, the periphery of which bears against the outer face of a rib $e'$, formed on the arm $e$. The upper and lower portions of this rib $e'$ are both concentric with the axis of pin $j$, but are of different radii, and the two portions are connected by an eccentric or cam-face $f'$, which as the lever D descends rides against and forces back the roller $d'$, thereby swinging the lever S about its pivot or fulcrum and causing the lower side of its horizontal arm to bear upon the upper side of the upper die-plate G and force the same downward into contact with the lower die-plate or with the interposed strip or ribbon. The form or curvature of cam-face $f'$ may be varied, as desired; but it is deemed advisable to make its action quite gradual, particularly toward the finish, at which time the greatest pressure upon the dies is required. The rear face of the upturned end of lever S coming into contact with the inner wall of the opening in top plate B arrests the movement of said lever and limits its rise. The pressing end of lever S is fashioned to bear upon the back or upper face of die-plate G and has an overhanging end $m'$ to bear upon and actuate the cut-off or finishing die at the proper time. The horizontal arm of lever S may be raised and held up by spring-pressure applied in any convenient way. The resilience of die-plate G will serve to maintain the lever at proper elevation and to hold its roller $d'$ in contact with the rib $e'$; but obviously a special spring may be provided for this purpose, as shown at $g'$ in Fig. 13. In order to sustain the lower die-plate H against the downward pressure exerted by lever S in forcing the die-plate G downward upon the strip or ribbon, the frame or spider $f$ is provided with a cross-bar beneath the backing-plate $r$ and close to or just out of line with the cut-off die, so that it may not interfere with the escape of the pieces punched from the strip or ribbon. The cut-off die is of the same character as in the previous machine—that is to say, it is of substantially I form in cross-section, or in the form of a rectangular body with semicircular grooves or channels in opposite faces and with a circular punch in each of said grooves or channels, preferably concentric with their curved faces. This die, which is shown in perspective in Fig. 14, coöperates with a companion die of like form, the latter serving to sustain the strip or ribbon operated upon while the die and punch act to cut out the piece separating the finished strip from the ribbon or strip on the reel.

T indicates the male die, U the female die, and $h'$ the punches carried by the male die and serving to perforate the final end of the finished plate and the initial end of the succeeding plate. The female die U is fixed or formed in the lower backing-plate r, and the male die T moves vertically in a box or guide V, mounted upon the backing-plate q of the upper die-plate G. The die T is provided with a laterally-projecting pin i″, beneath which is arranged an upwardly-acting spring j″, which serves to hold the die normally in an elevated position, its rise being limited and determined, however, by the upper end or wall of the slot in the guide V, through which the pin i″ projects. As the die T is carried by and revolves about the axis of the die-plates as said plates are rotated it comes beneath the overhanging end m′ of lever S only when the die-plate is turned to bring the word "Finish" opposite the pointer or indicator l. Hence it is not acted upon by the lever S when a letter or character is being formed or in spacing between letters or words. On the other hand, no letter-forming dies are carried by those portions of the die-plates which stand beneath the lever S at the time that the die T is in position to be actuated by said lever.

It is desirable that the machine be locked against unauthorized operation, that it shall be automatically locked when a strip is finished, and that it be automatically locked in the event that more than a given length of strip be operated upon or fed forward. Otherwise the strip might be withdrawn from the machine to any extent, either with or without characters produced therein or thereon. A locking device is therefore provided adapted to be set to release the mechanism and permit its operation to a predetermined extent, but to automatically resume its normal or locking position when a strip is completed and cut off or whenever a given amount of material has been fed forward. This mechanism is illustrated in Figs. 1, 2, 4, 8, 9, 10, 11, and 12 and comprises a locking-hook W, a hook-lifter X, and a latch or detent n′, carried by rock-shaft Y and provided with depending arms having inclines o′ and p′, one in the path of the descending pin i″ of the cut-off punch and the other in front or in the path of the advancing strip of material operated upon by the machine. The hook or lock W is arranged to engage over the projecting arm y of the feed slide or bar M when the bar is in its forward position or moved its full distance toward the front of the machine unless said hook be locked out of action in the manner presently described. The hook is provided with a tail or extension q′ and with an upwardly-extending arm r′, to which latter is attached one end of a spring s′, the other end of which is made fast to a stud on the under side of the top plate B, said spring serving to move downward the hooked end of the lock W. The descent of the hook is limited by a stop-pin t′, with which the arm r′ engages. The lifter X is likewise formed with an arm u′, to which is attached one end of a spring v′, the other end of which is similarly made fast to a lug on the under side of the top plate, said arm being arrested by a stop in the same manner as is the hook or locking member W. The outer end of the upper arm of lifter X, which lifter is made in the form of an elbow-lever, has a lateral spur w′, which bears beneath the nose of the hook of locking-arm W, as seen in Figs. 8, 9, 10, and 11, for the purpose of lifting said hook as the lifter itself is thrown upward. An upwardly-extending finger x′, rising from the spur w′ and curved on the arc of a circle concentric with the pivotal axis of lifter X, moves upward behind the projection y of feed-bar M as the lifter rises and of course stands in front thereof until the lifter falls far enough to carry the upper end of said finger below the projection y. As the locking-arm W is lifted the latch or detent n′, which is formed upon the depending portion of an arm extending outwardly from the rock-shaft Y, swings inward and engages over the tail q′ of the locking hook or member W, thus holding in elevated position its inner or hooked end, so that the projection y may pass beneath and clear of said hook. The finger x′ of the lifter serves to engage the projection y and prevent movement of the feed-bar M, while the lower arm z′ of the lifter is swinging back to its normal position, the upper extremity of said finger x′ falling below and clear of the projection y at the instant that the lifter X reaches its lowermost position and arm z′ attains its normal position. When the locking member W is thus thrown upward and locked by the detent n′ and the finger x′ falls below and clear of the projection y, the latter being unimpeded, the bar M is free to move forward under the pull of spring N whenever the roller v moves downward and inward sufficiently to let the wing w travel inward. It will thus be seen that after the locking devices are thrown to the position indicated in Fig. 12 the machine may be operated and the strip fed forward between the rolls I J and between the die-plates. When the desired length of strip has been embossed or operated upon, the cut-off die descending severs the finished strip or plate, and its pin i″, acting upon the incline o′ of rock-shaft Y, rocks said shaft in its bearings and throws the detent n′ away from over the tail q′ of the hook or locking member W, permitting the latter to descend and its hooked end to engage the projection y of the feed-bar M, thereby locking it against further action. If, however, the user of the machine instead of actuating the cut-off die at the proper time seeks to continue feeding the material through the machine—as, for instance, by setting the dial to spacing position and repeatedly operating the lever D—the forward or advancing end of the strip will when the strip is advanced a predetermined distance engage the incline p′ and cause a like rocking of shaft Y and consequent disengagement of the tail q′ of locking hook or member W.

The means for actuating the lifter X to release the feeding mechanism may be of any approved type, but in practice will ordinarily be a coin-controlled slide—that is to say, a slide which can be operated only after insertion of a coin or token of given character or value. This being common and set forth in the patents above referred to need not be here described.

It is found in the practical operation of machines of this class that there is a tendency of the strip to curl as the embossing proceeds, owing doubtless to the fact that the pressure is wholly from one side and the metal is thrown up on one face only. To guard against this, provision is made for lifting the portion of the strip or plate which has passed the embossing-dies, and thereby counteracting or neutralizing the tendency to bend downward. This result may be accomplished in any of a variety of ways, all involving, however, the same principle. In Fig. 15 the lower or male die is shown with a raised edge or bead, over which the strip passes as it leaves the embossing-point. As the tendency is to curve downward, this raised bead by preventing the descent of the strip at that point and holding it above the plane or level to which the strip is carried at the point of impression corrects the tendency or bends the strip sufficiently in a reverse direction to neutralize the natural tendency to curl, and as a consequence the strip preserves its straight or plane form. In Fig. 16 the lower die-plate is itself curled or bent upward to produce the raised edge $b^2$. In Fig. 17 a lever $c^2$ is represented as fulcrumed upon a post or support by the side of lever S and as having an inwardly-extending finger $d^2$ to bear beneath and lift up the embossed portion of the strip just beyond the embossing-point, the opposite end of said lever being in the path of a projection $e^2$, carried by the lever S. Any equivalent means—as, for instance, a fixed arm or support over which the plate or strip shall be compelled to ride in passing from the embossing-point and at proper elevation or level—may be adapted to produce the desired result.

Having thus described the invention, what is claimed is—

1. In a die-press, the combination of a rotatable body, comprising a dial or indicator-plate, and male and female die plates; a lever adapted to bear upon one of said die-plates and to force it toward the companion plate; and a main actuating-lever provided with a segmental arm having a cam-face to actuate the pressure-lever.

2. In a die-press, the combination of a rotatable dial-plate provided with notches or recesses to receive a locking-rib; male and female die plates carried by and rotatable with said dial-plate; a pressure-lever adapted to act upon one of said die-plates and to force it toward the companion plate; and a main actuating-lever having a segmental arm concentric with the axis of said lever and provided with a rib to enter the notches of the dial-plate and with a cam-face to bear against and actuate the pressure-lever.

3. In a die-press, the combination of a suitable cabinet or support; a top plate therefor, provided with a central opening; a rotatable dial or indicator plate reaching entirely across and serving to close said opening; and die-plates carried by and rotatable with the dial-plate and adapted to be introduced into and removed through the opening in the top plate.

4. In a die-press, the combination of a cabinet; a top plate provided with a central opening and with a depending frame or support; a spindle carried by said support; and a rotatable body, comprising die-plates and a dial-plate encircling said spindle and removable therefrom as one integral body at will, the die-plates being of a size to enter and pass through the opening in the top plate, and the dial-plate extending entirely across and by itself covering and closing said opening.

5. In a die-press, the combination of a rotatable dial or indicator plate, and a pair of die-plates firmly united one to the other, and in turn bodily secured to the dial-plate; whereby one pair of die-plates may be removed from and another applied to the dial-plate without liability of separation of the die-plates from each other or disturbance of their relation.

6. In combination with dial-plate C, provided with a neck or boss, separable die-plates G and H having male and female dies formed integral therewith, the male dies in one and the female dies in the other, said plates being united one to the other and detachably connected to the hub or boss of the dial-plate, substantially as described, whereby they may be removed from said hub or boss without separation one from the other.

7. In a die-press, the combination with a suitable case or cabinet, of a top plate secured thereto and provided with a central opening and with a depending spider, frame or support $f$; a spindle $h$ carried by said support; a dial-plate C encircling said spindle; die-plates G, H secured to each other; and screws or fastenings connecting the die-plates to the dial-plate, substantially as described, whereby upon removal of the dial-plate and dies from the spindle the die-plates may be detached from the dial-plate and others substituted.

8. In combination with die-plates provided respectively with male and female dies and movable with reference to a common impression-point, a pressure-lever arranged to bear upon one of said plates at said impression-point; a main actuating-lever provided with a segmental arm, and having a cam-face on one side to actuate the pressure-lever; and a support or guide on the opposite side of said arm to sustain the same and prevent its springing or bending while its cam-face bears upon the pressure-lever.

9. In combination with die-plates provided respectively with male and female dies and movable relatively to a fixed impression-point, a lever arranged to bear upon one of said plates at the impression-point and to force it toward the other plate; a main actuating-lever provided with a segmental arm having on one face a cam-surface arranged to bear upon and actuate the pressure-lever; and a roller arranged to bear against the opposite face of the segmental arm and to sustain said arm against springing or bending while its cam-surface is acting upon the pressure-lever.

10. In a die-press, the combination of a suitable top plate and supporting-frame carried thereby; a spindle carried by said frame; die-plates provided respectively with male and female dies; a dial-plate connected with said die-plates and serving to rotate the same; a pressure-lever S overhanging one of the die-plates and provided with a stud or bowl $d'$; a main actuating-lever D provided with an arm $e$; and a cam formed upon said arm and serving when the lever D is swung about its fulcrum to bear against the stud or bowl $d'$ and thereby to force the lever S against one of the die-plates and thus to force said plate toward its companion plate.

11. The herein-described die-press, comprising a suitable cabinet or support provided with a top plate; a supporting-frame beneath said top plate; a spindle carried by said supporting-frame; a dial-plate encircling said spindle and carrying die-plates provided respectively with male and female dies, the dial-plate being provided with peripheral notches; a pressure-lever having two arms, one overhanging one of the die-plates and the other being provided with a stud or bowl; a main actuating-lever provided with a segmental arm having a rib to enter the peripheral notches of the dial-plate and formed with a cam-face to act upon the stud or bowl of the pressure-lever; and a spring connected with the main operating-lever or its segmental arm and serving to hold the arm normally in a position where its rib is out of engagement with the notches of the dial-plate and its cam-surface is out of contact with the stud or bowl of the pressure-lever.

12. In combination with a suitable case or cabinet A, a top plate B provided with frame or spider $f$; spindle $h$ carried by said frame or spider; dial-plate C encircling said spindle and provided with peripheral notches and with character indications; die-plates G, H, connected and rotatable with said dial-plate and provided respectively with male and female dies; a pointer or indicator in proximity to the dial-plate; a yoke or cap-block secured to the spindle $h$ above the dial-plate; an operating-lever D provided with a segmental arm $e$, having a rib $d$ to enter the notches of the dial-plate, and a cam-face $f'$; a pressure-lever S, having an arm overhanging the die-plate G, and provided with a stud or bowl $d'$ in the path of the cam-face $f'$; and a spring E connected with the segmental arm and with a fixed support and serving to hold lever D normally in an elevated position.

13. In a die-press, the combination of a rigid die-plate and a yielding die-plate provided respectively with male and female dies; an elbow-lever having one arm arranged opposite or in position to bear upon the yielding die-plate, and another arm provided with a stud or bowl; and an actuating-lever having a cam-face to bear against said stud or bowl and thereby to force the lever against the yielding die-plate and to press said die-plate toward its companion plate.

14. In combination with rotatable die-plates G and H, and stop or gage plate R; feed-slide M, provided with an arm or finger $x$ to engage with the stop-plate, and with a blade or wing $w$; a spring N tending to move the slide M in one direction; a feed-roll I; a ratchet-wheel Q secured to the shaft or axle of the feed-roll I; a yoke P swinging about the axis of said shaft or spindle $t$, and provided with a pawl or dog $s$ to engage the ratchet-wheel; a link O connecting said yoke with the feed-slide M; a spring $u$ serving to hold the dog or pawl in engagement with the ratchet-wheel; a pressure-roll J; a yoke K carrying said roll J; a spring L bearing upon the yoke and serving to press the roll J toward roll I; a main actuating-lever D provided with segmental arm $e$; and a roller $v$ carried by said arm and adapted to ride in a curved path in front of the wing $w$ of feed-slide M and thus to permit said slide to move longitudinally under the stress of its spring as the lever descends, and serving to return the feed-slide to its normal position in opposition to the action of said spring as the lever rises.

15. In combination with a main actuating-lever D, provided with a stud or roller $v$; feeding mechanism comprising a sliding bar M provided with wing $w$; shaft or spindle $t$ carrying feed-roll I and ratchet-wheel Q; yoke P swinging about the shaft $t$, and provided with dog or pawl $s$; link O connecting bar M and yoke P; pawl or dog $k'$ engaging with ratchet-wheel Q and serving to prevent backward rotation thereof; pressure-roll J; pivoted yoke K carrying said roll; and spring L pressing upon said yoke and serving to urge the roll J toward roll I.

16. In a die-press, and in combination with suitable feed-rollers, an actuating-bar M therefor, provided with stop-finger $x$ and wing $w$; a spring N tending to move said bar in one direction; a stop-plate R located in the path of the finger $x$; and a main actuating-lever provided with a stud or roller $v$ arranged to act upon the wing $w$ to move the bar M in one direction or permit it to move in the opposite direction under the force of its spring N.

17. In a die-press of the character described, and in combination with feed devices and locking devices; a feed-bar M provided with a wing $w$, finger $x$ and arm $y$, serving respectively to receive the pressure of a stud or roller on the main actuating-lever to engage a stop or gage plate and to be engaged by the locking mechanism.

18. In combination with the feed-bar M of a die-press, an integral plate or member, comprising wing $w$, finger $x$, and arm $y$, as and for the purpose set forth.

19. In combination with a die-press and its feeding mechanism, a feed-bar M provided with an arm or projection $y$; a locking-latch W having a hook to engage said arm $y$; and a lifter X having an arm $w'$ to engage beneath and lift the hook or latch, and an upwardly-extending finger $x'$ to engage the arm $y$ during the descent of the lifter X and until the latter reaches its normal position.

20. In combination with a die-press and feeding-rollers therefor, a feed bar or slide for actuating the feeding-rollers, provided with a lateral arm or projection; a hook or latch located in the path of the arm or projection, and having a beveled end or nose to permit said arm to pass beneath and elevate said hook; and a lifter for disengaging the hook from the arm or projection, substantially as described.

21. In combination with a die-press and feeding devices therefor, a feed-actuating bar or slide provided with an arm or projection; a hook or latch adapted to engage with and hold said projection and through it the actuating-bar; a lifter for disengaging the hook or latch from said arm or projection; and a detent adapted to engage with and hold the latch when in its disengaged position.

22. In combination with feed-bar M and its projection $y$, a latch or lock W adapted to engage with said projection; and a gravitating catch or detent $n'$ adapted to engage with and hold the latch out of engagement with said arm or projection.

23. In a die-press, the combination with suitable dies and mechanism for feeding a strip or sheet of material thereto; a main actuating slide or bar for said feed mechanism provided with an arm or projection; a latch or hook adapted to engage said arm or projection and hold the bar against movement; a rock-shaft provided with a gravitating arm having a detent to engage and hold out of locking position the hook or latch; and an oblique wing carried by an arm of said rock-shaft and located in the path of the advancing material operated upon, whereby the rock-shaft may be rocked and caused to withdraw its detent from the latch or lock when the strip or material operated upon reaches a given point in its feed.

24. In a die-press, the combination with suitable dies and mechanism for feeding a strip or sheet of material thereto; a main actuating slide or bar for said feed mechanism provided with an arm or projection; a latch or hook adapted to engage said arm or projection and hold the bar against movement; a rock-shaft provided with a gravitating arm having a detent to engage and hold out of locking position the hook or latch; an oblique wing carried by said rock-shaft; a cut-off punch for severing the finished plate from the strip or sheet; and a projection carried by said punch and arranged to act upon the oblique wing and thereby to rock the shaft and withdraw the detent from the lock or latch.

25. In a die-press of the character described, the combination of a main actuating-lever provided with a stud or projection; a feed-actuating bar having a blade or wing in a plane oblique to the path of travel of said stud or projection; and a spring acting upon said bar and tending to hold said wing in contact with the stud or projection as the actuating-lever moves; whereby the bar M is caused to move in one direction under the force of the spring and in the other direction by the pressure of the stud or projection, the movement in each case being controlled by and proportionate to that of the actuating-lever.

26. In a die-press, the combination of male and female dies; means for forcing one die toward the other; and a support for the material operated upon at a point beyond the dies, adapted to sustain the material and prevent its curling or bending out of proper plane, substantially as described.

27. In combination with flexible die-plate G and rigid die-plate H provided respectively with sunken and raised dies, a rib or bead formed upon the die-plate H outside of or beyond the dies, substantially as and for the purpose set forth.

28. In combination with die-plates G and H, and means for forcing one of said plates toward the other, means substantially such as described for arresting the material operated upon and preventing its curling or bending out of proper plane while being acted upon by the dies.

In testimony whereof we have signed our names to this specification in the presence of two subscribing witnesses.

ALFRED W. ROOVERS.
ALEXANDER H. ROOVERS.

Witnesses:
REMSEN RUSHMORE,
HENRY F. RAYMOND.